United States Patent
Jeong et al.

(10) Patent No.: US 6,906,144 B2
(45) Date of Patent: Jun. 14, 2005

(54) POLYPROPYLENE-BASED RESIN COMPOSITION FOR POWDER SLUSH MOLDING

(75) Inventors: Kie Youn Jeong, Suwon-si (KR); Seung-Wook Lee, Daejeon (KR)

(73) Assignee: Hyundai Motor Company, Seoul (KR)

( * ) Notice: Subject to any disclaimer, the term of this patent is extended or adjusted under 35 U.S.C. 154(b) by 49 days.

(21) Appl. No.: 10/692,484

(22) Filed: Oct. 23, 2003

(65) Prior Publication Data

US 2004/0192824 A1 Sep. 30, 2004

(30) Foreign Application Priority Data

Mar. 27, 2003 (KR) .................... 10-2003-0019263

(51) Int. Cl.$^7$ ................. C08L 23/10
(52) U.S. Cl. .......... 525/240; 525/241; 525/232; 524/487; 524/490; 524/474
(58) Field of Search .............. 525/240, 241, 525/232; 524/474, 487, 490

(56) References Cited

U.S. PATENT DOCUMENTS 6,218,474 B1 * 4/2001 Valligny et al. ........... 525/194
6,506,495 B1 * 1/2003 Enami et al. ........... 428/424.8
6,812,285 B2 * 11/2004 Enami et al. ............. 525/88

FOREIGN PATENT DOCUMENTS

JP          07-278901         10/1995
JP          2000-204207 A  *  7/2000   ........... C08L/23/10

OTHER PUBLICATIONS

JP 2000–204207 (English translation).*
JP 10–287775, Oct. 27, 1998 (abstract in English only).*

* cited by examiner

*Primary Examiner*—David W. Wu
*Assistant Examiner*—Rip A. Lee
(74) *Attorney, Agent, or Firm*—Morgan Lewis & Bockius LLP

(57) ABSTRACT

A polyproplylene-based resin composition for powder slush molding which is a mixture of a polypropylene homopolymer, copolymer, or terpolymer; an olefin rubber; a styrene rubber; a process oil; and a polypropylene wax, wherein the composition is excellent in low-temperature impact resistance and heat resistance and has no offensive odor. The composition can be formed by a cryofreeze pulverization method in the presence of liquid nitrogen into a powder having an average particle size of 200 to 300 $\mu$m suitable for powder slush molding. The powder can be adhered to a polyurethane foamed layer and a surface treating agent without a primer coating. The powder is particularly suitable for forming the interior surface for manufacture of an automobile surface such as an instrument panel.

16 Claims, No Drawings

POLYPROPYLENE-BASED RESIN COMPOSITION FOR POWDER SLUSH MOLDING

CROSS-REFERENCE TO RELATED APPLICATIONS

This application claims priority of Korean Application No. 2003-19263, filed on Mar. 27, 2003, the disclosure of which is incorporated fully herein by reference.

1. Field of the Invention

The present invention relates to a polypropylene-based resin composition for powder slush molding. More particularly, the present invention relates to a composition comprising a mixture of a polypropylene homopolymer, copolymer, or terpolymer; an olefin rubber; a styrene rubber; a process oil; and a polypropylene wax, wherein the composition has material properties particularly suitable for forming surfaces for automobiles, and wherein the composition is in powder form suitable for powder slush molding, and a method of producing the powder.

2. Background of the Invention

Polyvinyl chloride resins have been widely used in interior component parts of an automobile, especially skin materials of automobile interior parts such as instrument panels, door trims, sunvisors, and the like and automobile interior carpet backing materials because they are excellent in various mechanical properties and available at a relatively low price. However, they are disadvantageous in many aspects. For example, vinyl chloride resins produce harmful odor due to the presence of a large amount of a plasticizer and also the presence of heavy metals contained in the heat-resistant stabilizer poses a problem of environmental pollution. Thus, in light of environmental safety, the development of other materials in place of the polyvinyl chloride resin is desired.

An instrument panel for an automobile typically comprises a skin material, an intermediate foam layer and a core, of which the skin material is made of polyvinyl chloride or a blend of acrylonitrile-butadiene-styrene copolymer and polyvinyl chloride, the intermediate foam layer contains polyurethane, and the core layer is made of a blend of polycarbonate and acrylonitrile-butadiene-styrene copolymer. The skin materials are molded by a powder slush molding method or a vacuum molding method.

A principal method of producing principal interior automotive parts includes powder slush molding method and vacuum molding method, as described above. The vacuum molding method has been preferred over the powder slush molding method due to its high processability and low manufacturing price. However, this method is problematic in that it leads to loss in raw materials and is difficult to be fabricated into products of a complicated shape having embossed patterns on the surface, compared to the powder slush molding method. Thus, the powder slush molding method has attracted more attention as a way to solve the above drawbacks and problems.

The powder slush molding method is practiced by spraying a powder resin on a heated mold surface and melting to result in the skin material. It requires rapid melt flow rate to obtain desired molded articles. From this point of view, the properties of polyvinyl chloride prepared by a polymerization have advantages in powdering, melt flow rate, and the like.

One problem with polyvinyl chloride is, however, that polyvinyl chloride resins for powder slush molding are poor in low-temperature impact resistance and heat resistance due to its own physical properties. Additionally, when used in related technologies such as invisible passenger airbags requiring guaranteed quality for a prolonged period and high-grade products, problems are encountered because the polyvinyl chloride material has poor low-temperature impact resistance and heat resistance. The polyvinyl chloride resins are also inherently disadvantageous in that: they are heavy in weight; and they are inferior in non-environmental pollution properties because of the use of a heat resistant stabilizer containing heavy metals to improve heat resistance of the resins. Further, vinyl chloride resins use a large quantity of a plasticizer which causes fogging on the internal surface of window glass of an automobile.

The inventors of the present invention have disclosed in Korean Patent Application No. 02-30283 and 02-55857 that a composition comprising polypropylene terpolymer, styrene rubber, olefin-based rubber, process oil and organic peroxide that can improve a melt index, provide soft feel as skin materials, be suitable for powder slush molding method by having rapid melt flow rate.

This composition, however, has some drawbacks since polypropylene is degraded by using an organic peroxide to increase a melt flow rate of polypropylene. For example, physical properties such as heat resistance, dimensional stability, and the like associated with polypropylenes are lowered and it requires an additional process in a manufacturing process which results in high production cost and low processability.

For the foregoing reason, there is a need for the development of a resin composition to be used as a material for interior surface of an automobile that can solve the problems described above.

SUMMARY OF THE INVENTION

In a preferred embodiment, the present invention is a polypropylene resin composition, preferably in powder form, that has excellent low-temperature impact resistance and heat resistance, has no offensive odor, and can be adhered to a polyurethane foamed layer and surface treating agent without primer coatings. A powder of this composition having an average particle size of 200 to 300 $\mu$m can be produced from the composition by a cryofreeze pulverization method in the presence of liquid nitrogen. The powder composition is suitable for powder slush molding of interior surfaces of an automobile or the like, such as an instrument panel.

Embodiments of the present invention provide an appropriate composition having excellent physical properties and soft feel and further is suitable for powder slush molding, and a proper particle size of powder for use in a method comprising adding a plasticizer which can maximize a melt flow rate of a conventional polypropylene.

The present invention also provides a resin composition for powder slush molding having no offensive odor, hardness, flexibility, heat resistance, low-temperature impact resistance, thus being suitable for automotive instrument panels. Further embodiments of the present invention provide an interior surface for automotive instrument panels employing said resin composition and a manufacturing process thereof.

The inventors have unexpectedly found that the melt flow rate of a polypropylene resin can be improved while maintaining the properties thereof by employing a plasticizer, for example a plasticizer such as has been used in polyvinyl chloride resins. Thereupon, in order to eliminate conventional problems mentioned above, the inventors have found out that when an appropriate amount of polypropylene wax is mixed with polypropylene, styrene rubber, olefin rubber, and process oil, the mixed composition provides a desirable melt flow rate which is suitable for powder slush molding without using an organic peroxide, and further it can maintain the desired properties of the polypropylene resin.

One embodiment of the invention is a polypropylene-based resin composition for powder slush molding comprising a mixture of: a polypropylene homopolymer, copolymer (i.e., a bipolymer), or terpolymer; an olefin rubber; and a styrene rubber; mixed appropriately with a process oil and a polypropylene wax, wherein the composition is excellent in low-temperature impact resistance and heat resistance, has no offensive odor, and can be adhered to a polyurethane foamed layer and surface treating agent without a primer coating. The powder advantageously has an average particle size of 200 to 300 μm and can be produced from the composition by a cryofreeze pulverization method in the presence of liquid nitrogen. The powder composition is suitable for construction of an interior surface of an automobile or the like, such as an instrument panel.

DETAILED DESCRIPTION OF THE INVENTION

A polypropylene-based resin composition suitable for powder slush molding is provided, comprising 1 to 40 parts by weight of polypropylene, 10 to 50 parts by weight of styrene rubber, 10 to 50 parts by weight of ethylene-α-olefin copolymer rubber, 1 to 20 parts by weight of process oil, and 1 to 30 parts by weight of polypropylene wax, relatively, with reference to 100 parts by weight of the polypropylene resin composition.

The present invention is also to provide a method for manufacturing powder for slush molding by a cryofreeze pulverization method wherein the polypropylene-based resin composition is formed into a powder having a diameter of about 200 to about 300 μm. The cryofreeze pulverization method advantageously is performed at a low temperature in the presence of liquid nitrogen. The resulting powder is useful for powder slush molding of, for example, an interior surface for an automobile such as an instrument panel.

The present invention is also to provide an interior surface of an automobile such as an instrument panel produced by the above method.

The present invention will be described in detail hereunder. The present invention provides a polypropylene-based resin composition for powder slush molding which satisfies efficiency and material property requirements for skin materials of automotive instrument panel substrate, including moldability, and is practicable to perform a direct coating without a primer coating of the substrate. According to the present invention, styrene rubber and olefin rubber are added with polypropylene to provide low-temperature impact resistance and soft feel, and process oil and polypropylene wax are additionally added to improve a melt flow rate.

The individual components of the resin compositions of this invention are discussed below. All amounts of primary components (A) Polypropylene, (B) Styrene rubber, (C) Ethylene-α-olefin copolymer rubber, (D) Process oil, and (E) Polypropylene wax, are given in parts by weight based on 100 parts by weight of the polypropylene-based resin composition. When compositions of a polymer are provided, the units are in parts by weight and are based on 100 parts of the polymer.

(A) Polypropylene

The amount of polypropylene used in the present invention is 1 to 40 parts by weight, alternately 10 to 40 parts by weight, for example 20 to 30 parts by weight, i.e., about 25 parts by weight, with reference to 100 parts by weight of the polypropylene-based resin composition. The polypropylene improves moldability of powder slush molding, heat resistance and physical properties. When the amount of polypropylene is less than 1 part by weight, the moldability and heat resistance are both deteriorated. On the other hand, when the amount is more than 40 parts by weight, the hardness is rapidly increased and the low-temperature impact resistance becomes lowered.

The polypropylene in the present invention is a propylene homopolymer, a copolymer of propylene-ethylene, a terpolymer of propylene-ethylene-butene, or mixture thereof. A melt flow rate is preferably from 20 to 70 g/10 min (230° C., 2.16 Kgf), more preferably 40 to 60 g/10 min (230° C., 2.16 Kgf), for powder slush molding. It is preferable to use a terpolymer having a melt index of 40 to 60 g/10 min (230° C., 2.16 Kgf) to provide a faster melt flow rate because the terpolymer has 10° C. to 20° C. lower melting temperature than a similar propylene homopolymer or dipolymer, and to maintain lower hardness than conventional polypropylene resin.

(B) Styrene Rubber

The amount of styrene rubber used in the present invention is 10 to 50 parts by weight, for example 20 to 40 parts by weight, i.e., about 30 parts by weight, with reference to 100 parts by weight of the polypropylene-based resin composition. The styrene rubber provides desirable low-temperature impact resistance and hardness. When the amount of styrene rubber is used not higher than 10 parts by weight, the low-temperature impact resistance and soft feel become deteriorated. On the other hand, when the amount is more than 50 parts by weight, the moldability becomes deteriorated because the viscosity and hardness are rapidly lowered and the manufacturing price can be costly because the styrene rubber is expensive.

The styrene rubber provides low-temperature impact resistance and soft feel due to its unique structure. The styrene rubber has similar physical properties of a vulcanized rubber at a relatively low viscosity and an excellent impact resistance because a glass transition temperature thereof is −80° C. which can estimate the characteristics at a low temperature. Further, it has an excellent absorptivity to a process oil and various fillers and is suitable for adhesives, impact resistance modifiers, alternative rubbers and the like.

The styrene rubber of the present invention is preferably a copolymer of styrene, butadiene and ethylene having a melt index of 10 to 60 g/10 min (200° C., 5 kgf), for example about 25 g/10 min (200° C., 5 kgf). The styrene rubber is preferably a copolymer mixed in the ratio of 10 to 60 parts, for example about 20 parts, by weight of styrene and 40 to 90 parts, for example about 80 parts, by weight of butadiene and ethylene. The styrene rubber may be a dipolymer, a terpolymer, or a star-shaped polymer depending on the type of a bonding between styrene and butadiene and ethylene. Advantageously, styrene rubber having a shore hardness of 20 to 80 A, for example a rubber having a hardness of about 42 A, may be used. In one embodiment, a preferred styrene rubber comprises 20 to 40 parts by weight of styrene and 60 to 80 parts by weight of butadiene and ethylene, and has a shore hardness of 40 A or less, to provide improved low-temperature impact resistance and homolytic moldability.

(C) Ethylene-α-Olefin Copolymer Rubber

The amount of ethylene-α-olefin copolymer rubber used in the present invention is 10 to 50 parts by weight, for example 20 to 40 parts by weight, alternately about 20 parts by weight, compared to 100 parts by weight of the polypropylene-based resin composition. The ethylene-α-olefin copolymer rubber provides low-temperature impact resistance and soft feel. When the amount of ethylene-α-olefin copolymer rubber is not higher than 10 parts by weight, the impact resistance and soft feel are deteriorated, while if the amount is more than 50 parts by weight, the moldability becomes deteriorated because the viscosity and hardness are rapidly lowered. The ethylene-α-olefin copolymer is a copolymer of ethylene and an α-olefin having 2 to 10 carbons of which examples include propylene, butene, pentene, hexene, propene, octane, and the like. Examples of ethylene-α-olefin copolymer rubbers include ethylene-propylene rubber (EPR), ethylene-propylene-diene rubber (EPDR), ethylene-octene rubber (EOR), and the like. Of these ethylene-α-olefin copolymer rubbers, ethylene-octene rubber provides excellent low-temperature impact resistance because the length of the octene monomer is long. The ethylene-octene rubber advantageously contains 10 to 40 parts by weight of octene, and has a Mooney viscosity of 10 to 50 ($ML_{1+4}$, 121° C.), alternately a Mooney viscosity of 10 to 40 ($ML_{1+4}$, 121° C.). In one embodiment, a preferred EOR has 20 to 35 parts by weight of octene and a Mooney viscosity of 20 to 50 ($ML_{1+4}$, 121° C.).

In other embodiments, the ethylene-α-olefin copolymer rubber may be ethylene-propylene, ethylene-butene, ethylene-octene, and so on, or mixtures thereof. However, ethylene-octene rubber, which is commercially available from US Dupont-Dow Elastomers and widely used for impact resistant, is a preferred ethylene-α-olefin copolymer rubber for the low-temperature impact resistance.

(D) Process Oil

The styrene-ethylene-butadiene copolymer and ethylene-octene rubber described above have slow melt flow rate and thus, provides poor moldability due to high molecular weight. Therefore, the amount of process oil used in the present invention is 1 to 20 parts by weight, for example 5 to 15 parts by weight, i.e., about 10 parts by weight, with reference to 100 parts by weight of the polypropylene-based resin composition. The process oil reinforces flexibility and moldability. When the amount is less than 1 part by weight, a proper moldability cannot be obtained. On the other hand, if the amount is more than 20 parts by weight, it may cause serious contamination on the automobile window because the process oil is transited onto the surface and vaporized. This process oil serves to lower the melt viscosity of the composition and makes it possible to produce a soft, flexible skin by passing into the chain. This processing oil as used herein is a softening agent which provides flexibility and moldability of the composition and a compounding agent which increases the volume and is divided into process oil and extender oil but it is generally called as herein a process oil.

The use of processing oil not only provides excellent processability of high molecular weight rubber, but use of the process oil also provides a desirable range of hardness in compositions with low rubber content. Further, the use of process oil in the powder slush molding method improves the melt flow rate of the composition while maintaining a desirable range of low-temperature impact resistance and hardness. The process oil may be paraffin oils, naphthene oils and aromatic oils, with paraffin oils being preferable to reinforce the workability, flexibility and processability. Paraffin oils are also preferred to reduce odor.

Paraffin oils, of which examples include normal-paraffin and iso-paraffin oils, have the least discoloration and smelling problem and are excellent in compressibility, staining resistance and characteristics at low temperature. However, they are poor in strength and compatability.

Naphthene oils are also excellent in staining resistance, characteristics at low temperature, processability, and aging resistance but poor in tensile strength and elastic modulus. They have offensive odor unlike the paraffin oils.

Aromatic oils are also good in physical properties like naphthene oils but have offensive odor as compared to the paraffin oils.

Therefore, it is preferable to use paraffin oils having no offensive odor for one of the purpose of the present invention. Paraffin oils of various kinds having a viscosity of 10 to 800 centi-Stokes (40° C.) are useful, but paraffin oils having a high viscosity of 400 to 800 centi-Stokes (40° C.), for example 400 to 600 centi-Stokes (40° C.), are preferably used to prevent its transition on the surface and subsequent volatilization.

In other embodiments, the processing oil may include naphthene oils, aromatic oils, or a mixture of one or both with paraffin oils. These process oils having a viscosity of 10 to 800 centi-Stokes (40° C.) are useful, but oils having a high viscosity of 400 to 600 centi-Stokes (40° C.) are preferably used to prevent its transition on the surface and subsequent volatilization.

(E) Polypropylene Wax

The amount of polypropylene wax used in the present invention is 1 to 30 parts by weight, alternately 5 to 25 parts by weight, for example 10 to 20 parts by weight, i.e., about 15 parts by weight, with reference to 100 parts by weight of the polypropylene-based resin composition. The polypropylene wax increases the melt flow rate of polypropylene or polypropylene and rubber. When the amount is less than 1 part by weight, the melt index of the composition is not sufficient. On the other hand, when the amount is more than 30 parts by weight, the melt index of the composition becomes too high to obtain the desired moldability.

The polypropylene wax which has been degraded chemically or physically may be used. A polyolefin wax that is widely used as an additive for regulating the plasticizing behavior of polyvinyl chloride compounds like a phthalate-type plasticizer and is used to improve flow properties and regulate the melt flow rate, is preferred because of its low viscosity. Examples of polyolefin wax include polyethylene or polypropylene waxes. Polypropylene waxes may be advantageous particularly in the present invention because they are more compatible with polypropylene resin composition. However, in other embodiments, the polypropylene wax may be partially or fully replaced with other polyolefin waxes, for example a polyethylene wax, such that the total amount of wax is substantially the same as listed herein for polyproplylene wax.

The polypropylene wax has different characteristics depending on homopolymers, copolymers (i.e., a bipolymer) and terpolymers used in the base material, but conventional polypropylene waxs are produced by degradation of homopolymers or copolymers.

According to the present invention, polypropylene wax having a viscosity of 50 to 1,000 cps (170° C., Brookfield viscometer) are commercially available. Preferred polypropylene wax having a viscosity of 50 to 800 cps (170° C., Brookfield viscometer) are used for desired melt flow rate and physical properties in the present invention. If the viscosity is below 50 cps, wax may be transited onto the surface at a heating temperature. On the other hand, if the viscosity is higher than 800 cps, a melt flow rate is not preferable for powder slush molding process.

When the polypropylene wax is used in the present invention, it regulates a melt flow rate promptly with low heat, and further improves flow properties of polypropylene or polypropylene rubbers. In other words, the low viscosity of the wax allows improved melting at low temperature and this further allows improved initial melting of the whole resin composition which in turn promotes a favorable melt flow rate.

The polypropylene resin composition described above can be used for the interior surface for an automobile or the like such as an instrument panel. The automotive instrument panel is prepared by conventional methods, preferably by powder slush molding method. The polypropylene resin composition can be made by conventional methods, and can for example be extruded as pellets. The polypropylene resin composition powder suitable for powder slush molding can advantageously be manufactured through a cryofreeze pulverization of the composition pellets in the presence of liquid nitrogen. An average particle size of powder is preferably from 200 to 300 $\mu$m, for example about 250 $\mu$m. If the particle size is deviated from this range, the moldability is deteriorated.

As described above, the resin composition of the present invention comprises styrene-based and olefin-based rubbers to lower hardness and improve low-temperature impact resistance of polypropylene; a process oil to improve a melt flow rate of rubbers and maintain a low hardness with a low content of rubbers; and a polypropylene wax to allow improved melt flow rate. This resin composition in a preferred embodiment has a shore hardness of 70 to 80 A and no offensive odor, and is excellent in heat resistance, flexibility, impact resistance and moldability for the powder slush molding. Further, most of components used in the present invention are olefins, and thus problems related to offensive odor or heavy metals can be eliminated.

When the resin composition of the present invention is used for automotive interior parts of instrument panels, the panels can be of good quality due to the advantages of the melt flow rate and physical properties of the polypropylene resin composition.

The resin composition of the present invention will contribute to an increase of a quality of automobiles by satisfying the requirement of guaranteed quality for a prolonged period and high-grade products having excellent properties such as durability, heat resistance, improved (lower) heavy metal contents, and no offensive odor. Further, since we have unexpectedly found the powder slush molding method is practicable to perform a direct coating on the intermediate layer without a primer coating, the number of steps and cost of the coating process is reduced, and organic solvents used therefore and wastes produced therefrom may be also reduced.

In one embodiment of the invention, the polypropylene-based resin composition suitable for powder slush molding consists essentially of the polypropylene, styrene rubber, ethylene-α-olefin copolymer rubber, process oil, and polypropylene wax as defined above. The resin may include additives such as dyes, stabilizers, and the like, present in an amount to provide the desired effect.

This invention is further illustrated by the following examples. These examples should not be construed as limiting the scope of this invention in any manner.

EXAMPLES 1 TO 3

Polypropylene resin compositions of Examples 1 to 3, having compositions as shown in Table 1, were prepared, wherein each component of (A), (B), (C), (D), and (E) had the following conditions:

(A) Polypropylene terpolymer having a melt index of about 40 g/10 min;

(B) Styrene copolymer rubber comprised of 20 weight % of styrene, 80 weight % of butadiene and ethylene, having a melt index of about 25 g/10 min and a shore hardness of about 42 A;

(C) Ethylene-octene rubber comprised of 35 weight % of octene and having a Mooney viscosity of 35 ($ML_{1+4}$, 121° C.);

(D) Paraffin oil having a viscosity of about 500 centiStokes (40° C.); and (E) Polypropylene wax having a viscosity of 200 cps (170° C., Brookfield viscometer).

All the components as shown in Table 1 were well mixed in tumbler for 5 min. and pellets were formed by extruding with a twin screw extruder at 190° C. to 220° C. and cold solidification. The pelletized compositions were frozen with liquid nitrogen and crushed with a disk mill to obtain polypropylene powder having a size of 250 $\mu$m.

Molding samples were prepared from the powder as follows. The powder was put in a 20×20×10 cm box, and a 20×20 cm flat electro-mold with embossing patterns heated for 30 minutes in an oven kept at 400° C. was connected with the powder box. The mold and the powder box were rotated. Then, residual powders adhering to the mold were removed. The mold was separated and the molded sheet samples were prepared. The prepared sheet samples were used for physical properties in Experimental Example. The composition and material property test results are summarized in Table 1.

COMPARATIVE EXAMPLE 1

Commercially available polyvinyl chloride resin (PVC) was molded by the same procedure in Examples. The material property test results are summarized in Table 1.

COMPARATIVE EXAMPLES 2 AND 3

The following components with the contents as shown in Table 1 were mixed and the mixture was molded by the same procedure in Examples. The composition and material property test results are summarized in Table 1.

(A) Polypropylene terpolymer having a melt index of 200 g/10 min or higher;

(B) Styrene copolymer rubber comprised of 20 weight % of styrene, 80 weight % of butadiene and ethylene, having a melt index of about 25 g/10 min and a shore hardness of 42 A;

(C) Ethylene-octene rubber comprised of 35 weight % of octene and having a Mooney viscosity of 35 ($ML_{1+4}$, 121° C.); and (D) Paraffin oil having a viscosity of about 500 centiStokes (40° C.).

MATERIAL PROPERTY TEST METHODS

For the compositions prepared by above Examples 1 to 3 and Comparative Examples 1 to 3, material properties were determined as follows.

1) Shore A Hardness:

A sheet was cut into 15 cm×15 cm×0.6 cm. It was tested for Shore A hardness in accordance with JIS K 6301 and determined with a Shore A durometer produced by Zwick Testing Machines, Ltd. Retention time was 10 seconds.

(2) Melt Index:

A melt index was measured in accordance with ASTM D-1238 and determined according to a condition at 230° C. and under 2.16 kg of load.

(3) Low-Temperature Impact Resistance:

The sheet prepared by powder slush molding method was fixed in cup-shaped mold and placed at a chamber of a temperature of −40° C. for 4 hours. Low-temperature impact resistance was determined by dropping a ball having a diameter of 50 mm and a mass of 5 Kg from the height of 1 m. When broken pieces were formed, it was determined as low impact resistance.

(4) 100% Modulus:

A sheet was cut into 12.7×127×6.4 mm and tested for 100% modulus in accordance with ASTM D-790. A crosshead speed was 500 mm/min. When the sheet was stretched 100%, the modulus was measured.

(5) Odor:

Odor of a sheet prepared by powder slush molding method having a size of 10 cm×10 cm×1.5 cm was charged into a 4 L container sealed. It was heated at 60° C. for 1 hr and 20 min and cooled for 20 min and then, odor was evaluated by 5 observers based on total of 5 grades. A number of observers who evaluated for offensive odor were subtracted from 5. It is recommended that the samples be higher than 4.

(6) Fogging Value:

A sheet prepared by powder slush molding method was cut into a circle with a diameter of 70 mm. After the sample was placed in a beaker and covered with a glass plate, it was heated in a double boiler filled with silicon oil at 100° C. for 4 hr. The glass plate was measured by Hazemeter.

(7) Moldability:

The composition was fed onto a nickel, silicon-resin electroformed embossed plate having a size of 20 cm×20 cm, heated to a surface temperature of 400° C. for 30 min, followed by a cryofreeze pulverization to obtain powder. The powder was sprayed on the surface and the moldability was evaluated based on the smoothness of the back surface.

(8) Particle Size;

Particle size of the powder was measured by a particle sizing instrumentation of US Malvern Instrument (Model: SB.09). Ethyl alcohol was used as a particle dispersion solvent.

As shown in Table 1, the melt index of the compositions of examples 1 to 3 increased with an increase in the amount of a polypropylene wax and also the 100% modulus was slightly increased. It was further noted that the compositions of examples 1 to 3 exhibited superior smoothness of the surface, and excellent low-temperature impact resistance and moldability. On the other hand, the compositions of comparative examples 1 to 3 showed good in moldability but poor in low-temperature impact resistance, odor and fogging value. When polypropylene having a melt index of 40 g/10 min was used with 10 parts by weight of a polypropylene wax in example 1, physical properties thereof provided similar to those of the composition using polypropylene having a melt index of 200 g/10 min in comparative example 2, although the 100% modulus of the composition of example 1 was superior to that of comparative example 2. The composition of comparative example 3 containing 35 parts by weight of polypropylene wax exhibited a relatively high melt index. The melt index was too high to obtain desired smoothness of the surface and the content of polypropylene was too low to obtain desired 100% modulus.

As described above, the resin composition for powder slush molding comprises polypropylene, olefin rubber, styrene rubber, process oil and polypropylene wax to provide improved moldability, impact resistance, heat resistance, and other physical properties with low content of rubber, wherein the composition becomes suitable for interior surface for an automobile. Further, the composition of the present invention has no offensive odor and heavy metal therein so that it can be environmentally friendly by replacing polyvinyl chlorides with olefins and cost effective by using less content of rubber compared to the conventional olefins comprised of polypropylene/rubber compounding materials.

What is claimed is:

1. A polypropylene-based resin composition for powder slush molding comprising:
   (A) 1 to 40 parts by weight of a polypropylene;
   (B) 10 to 50 parts by weight of a styrene rubber;
   (C) 10 to 50 parts by weight of an ethylene-α-olefin copolymer rubber;
   (D) 1 to 20 parts by weight of a process oil; and
   (E) 1 to 30 parts by weight of a polypropylene wax with reference to 100 parts by weight of the resin composition.

2. The polypropylene-based resin composition for powder slush molding according to claim 1, wherein said polypropylene is selected from the group consisting of polypropylene homopolymer, propylene-ethylene copolymer, and

TABLE 1

|  | A | B | C | D | E | Particle size (μm) | Hardness (A) | Melt index (10 g/10 min) | 100% modulus | Low-temperature impact resistance | Fogging value | Odor | Moldability |
|---|---|---|---|---|---|---|---|---|---|---|---|---|---|
| Ex. | | | | | | | | | | | | | |
| 1 | 30 | 30 | 20 | 10 | 10 | 250 | 71 | 60 | 65 | Good | 2 | 4 | Good |
| 2 | 25 | 30 | 20 | 10 | 15 | 250 | 71 | 75 | 68 | Good | 2 | 4 | Good |
| 3 | 20 | 30 | 20 | 10 | 20 | 250 | 71 | 90 | 74 | Good | 2 | 4 | Good |
| Com. Ex. | | | | | | | | | | | | | |
| 1 | Polyvinyl chloride | | | | | 170 | 75 | — | 85 | Poor | 8 | 2 | Good |
| 2 | 30 | 30 | 30 | 10 | — | 250 | 70 | 65 | 45 | Good | 2 | 4 | Good |
| 3 | 5 | 25 | 25 | 10 | 35 | 250 | 70 | 130 | 36 | Good | 2 | 4 | Good | propylene-ethylene-butene terpolymer and has a melt index of 20 to 70 g/10 min at 230° C. under 2.16 kg of load.

3. The polypropylene-based resin composition for powder slush molding according to claim 1, wherein said styrene rubber comprises 10 to 60 parts by weight of styrene and 40 to 90 parts by weight of a combination of butadiene and ethylene based on 100 parts of styrene rubber, and has a melt index of 10 to 60 g/10 min at 200° C. under 5 kg of load.

4. The polypropylene-based resin composition for powder slush molding according to claim 1, wherein said ethylene-α-olefin copolymer rubber comprises 10 to 40 parts by weight of octene per 100 parts of ethylene-α-olefin copolymer, and has a Mooney viscosity ($ML_{1+4}$, 121° C.) of 10 to 40.

5. The polypropylene-based resin composition for powder slush molding according to claim 1, wherein said process oil is selected from the group consisting of paraffin, aromatic, and naphthene oils having a viscosity of 10 to 800 centi-Stokes (40° C.).

6. The polypropylene-based resin composition for powder slush molding of claim 1, wherein said polypropylene wax is selected from the group consisting of propylene homopolymer, propylene-ethylene copolymer, and propylene-ethylene-butene terpolymer and has a viscosity of 50 to 800 cps (170° C., Brookfield viscometer).

7. The polypropylene-based resin composition for powder slush molding of claim 1, the composition with reference to 100 parts by weight of the composition comprising:
   (A) 20 to 30 parts by weight of the polypropylene, wherein the polypropylene is selected from the group consisting of polypropylene homopolymer, propylene-ethylene copolymer, propylene-ethylene-butene terpolymer, or mixtures thereof, and has a melt index of 20 to 70 g/10 min at 230° C. under 2.16 kg of load;
   (B) 20 to 40 parts by weight of the styrene rubber, wherein the styrene rubber comprises 10 to 60 parts by weight of styrene and 40 to 90 parts by weight of a combination of butadiene and ethylene based on 100 parts of styrene rubber, and has a melt index of 10 to 60 g/10 min at 200° C. under 5 kg of load;
   (C) 20 to 40 parts by weight of the ethylene-α-olefin copolymer rubber, wherein the ethylene-α-olefin copolymer rubber comprises ethylene-octene rubber, and has a Mooney viscosity ($ML_{1+4}$, 121° C.) of 10 to 50;
   (D) 5 to 15 parts by weight of the process oil, wherein the process oil comprises paraffin oil, and has a viscosity of 400 to 800 centi-Stokes (40° C.); and
   (E) 10 to 20 parts by weight of the polypropylene wax, wherein the polypropylene has a viscosity of 50 to 800 cps(170° C., Brookfield viscometer).

8. The polypropylene-based resin composition for powder slush molding of claim 1, the composition with reference to 100 parts by weight of the composition comprising:
   (A) 20 to 30 parts by weight of propylene-ethylene-butene terpolymer having a melt index of 40 to 60 g/10 min at 230° C. under 2.16 kg of load;
   (B) 20 to 40 parts by weight of the styrene rubber having a melt index of 10 to 60 g/10 min at 200° C. under 5 kg of load and a hardness of 20 to 80 Shore A;
   (C) 20 to 40 parts by weight of ethylene-octene rubber having 20 to 35 parts by weight octene per 100 parts of ethylene-octene rubber and a Mooney viscosity ($ML_{1+4}$, 121° C.) of 20 to 50;
   (D) 5 to 15 parts by weight of paraffin process oil having a viscosity of 400 to 600 centi-Stokes (40° C.); and
   (E) 10 to 20 parts by weight of polypropylene wax having a viscosity of 50 to 800 cps (170° C., Brookfield viscometer).

9. The polypropylene-based resin composition for powder slush molding of claim 1, the composition with reference to 100 parts by weight of the composition comprising:
   (A) 10 to 40 parts by weight of propylene-ethylene-butene terpolymer having a melt index of 20 to 70 g/10 mm at 230° C. under 2.16 kg of load;
   (B) 20 to 40 parts by weight of the styrene rubber comprising 10 to 60 parts by weight of styrene and 40 to 90 parts combined of ethylene and butadiene per 100 parts of styrene rubber;
   (C) 20 to 40 parts by weight of ethylene-octene rubber;
   (D) 5 to 15 parts by weight of process oil having a viscosity of 400 to 800 centi-Stokes (40° C.); and
   (E) 5 to 25 parts by weight of polypropylene wax having a viscosity of 50 to 800 cps (170° C., Brookfield viscometer).

10. The polypropylene-based resin composition for powder slush molding of claim 1, composition with reference to 100 parts by weight of the composition comprising:
   (A) 10 to 40 parts by weight of propylene-ethylene-butene terpolymer having a melt index of 20 to 70 g/10 min at 230° C. under 2.16 kg of load;
   (B) 20 to 40 parts by weight of the styrene rubber comprising 10 to 60 parts by weight of styrene and 40 to 90 parts combined of ethylene and butadiene per 100 parts of styrene rubber;
   (C) about 20 parts by weight of ethylene-α-olefin copolymer rubber;
   (D) 5 to 15 parts by weight of process oil having a viscosity of 400 to 800 centi-Stokes (40° C.); and
   (E) 5 to 25 parts by weight of polypropylene wax having a viscosity of 50 to 800 cps (170° C., Brookfield viscometer).

11. The polypropylene-based resin composition for powder slush molding of claim 1, wherein the composition is a substantially homogenous powder having a particle size of between about 200 μm to about 300 μm.

12. The polypropylene-based resin composition for powder slush molding of claim 7, wherein the composition is a substantially homogenous powder having a particle size of between about 200 μm to about 300 μm.

13. The polypropylene-based resin composition for powder slush molding of claim 8, wherein the composition is a substantially homogenous powder having a particle size of between about 200 μm to about 300 μm.

14. The polypropylene-based resin composition for powder slush molding of claim 9, wherein the composition is a substantially homogenous powder having a particle size of between about 200 μm to about 300 μm.

15. The polypropylene-based resin composition for powder slush molding of claim 10, wherein the composition is a substantially homogenous powder having a particle size of between about 200 μm to about 300 μm.

16. A polypropylene-based resin composition for powder slush molding comprising:
   (A) 10 to 40 parts by weight of a polypropylene, wherein the polypropylene is selected from the group consisting of polypropylene homopolymer, propylene-ethylene copolymer, propylene-ethylene-butene terpolymer, or mixtures thereof, and has a melt index of 20 to 70 g/10 min at 230° C. under 2.16 kg of load;
   (B) 20 to 40 parts by weight of a styrene rubber comprising 10 to 60 parts by weight of styrene per 100 parts of styrene rubber and has a melt index of 10 to 60 g/10 min at 200° C. under 5 kg of load;

(C) 10 to 50 parts by weight of an ethylene-α-olefin copolymer rubber selected from the group consisting of ethylene-propylene rubber, ethylene-propylene-diene rubber, ethylene-octene rubber, or mixtures thereof, and has a Mooney viscosity ($ML_{1+4}$, 121° C.) of 10 to 50;

(D) 5 to 15 parts by weight of the process oil, wherein the process oil comprises paraffin oil, and has a viscosity of 400 to 800 centi-Stokes (40° C.); and (E) 5 to 25 parts by weight of a polyolefin wax selected from the group consisting of propylene homopolymer wax, propylene-ethylene copolymer wax, propylene-ethylene-butene terpolymer wax, polyethylene wax, or mixture thereof, and has a viscosity of 50 to 800 cps (170° C., Brookfield viscometer), with reference to 100 parts by weight of the resin composition, wherein the composition is a substantially homogenous powder having a particle size of between about 200 μm to about 300 μm.

* * * * *